(12) United States Patent
Reese

(10) Patent No.: US 7,327,873 B2
(45) Date of Patent: Feb. 5, 2008

(54) FAST SOFTWARE ROTATION OF VIDEO FOR PORTRAIT MODE DISPLAYS

(75) Inventor: Robert J. Reese, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 10/456,335

(22) Filed: Jun. 6, 2003

(65) Prior Publication Data

US 2004/0247178 A1   Dec. 9, 2004

(51) Int. Cl.
*G06K 9/00* (2006.01)
*G06F 13/00* (2006.01)

(52) U.S. Cl. ...................................... 382/162

(58) Field of Classification Search ............... 382/162, 382/164, 167, 276, 294, 296, 305; 358/1.18, 358/515, 518, 523; 345/589, 629, 600–604
See application file for complete search history.

(56) References Cited

U.S. PATENT DOCUMENTS

| 6,172,714 B1* | 1/2001 | Ulichney ................... 348/560 |
| 6,323,854 B1* | 11/2001 | Knox et al. ................ 345/418 |
| 2003/0081848 A1* | 5/2003 | Wada ........................ 382/240 |
| 2004/0109086 A1* | 6/2004 | Mathew et al. ............ 348/453 |
| 2005/0017986 A1* | 1/2005 | Anwar et al. .............. 345/629 |
| 2005/0162436 A1* | 7/2005 | Van Hook et al. ......... 345/546 |

* cited by examiner

*Primary Examiner*—Amir Alavi
(74) *Attorney, Agent, or Firm*—Blakely, Sokoloff, Taylor & Zafman LLP

(57) ABSTRACT

In one embodiment, a method is provided. The method comprises loading a processor with data from a source buffer, the data representing pixels from a first color space, and the pixels being ordered for display in a first orientation, transforming the data into data within a second color space, and storing the transformed data in a destination buffer in an order for display in a second orientation.

12 Claims, 8 Drawing Sheets for every 16 source rows for every 2 source cols for each 2X2 block within the 2X16 block YUVtoRGB 4 pixels, storing 4 16-bit values to temp buffer copy 16 pixels from temp buffer to destination, 2X preload 1 source row (1 of 0 . .15)

Figure 8

FAST SOFTWARE ROTATION OF VIDEO FOR PORTRAIT MODE DISPLAYS

FIELD OF THE INVENTION

This invention relates to image processing. In particular, the invention relates to the rotation of image data to change an orientation of an image constructed using the image data.

BACKGROUND

Hand-held electronic devices, such as Personal Digital Assistants (PDAs), Personal Video Players (PVPs) and other types of media players can be held in a portrait orientation or in a landscape orientation.

In the portrait orientation, a long dimension of a display screen of the electronic device is vertical, whereas in the landscape orientation, the long dimension is horizontal. In order to generate images on the display screen, image data in the form of pixels is read by a display controller from an area of memory (frame buffer) and painted on the display screen. The layout of the pixels (portrait or landscape) in the frame buffer is determined by the display controller hardware, with many current devices using portrait mode displays. If the electronic device is to be used in an orientation that is not the same as the display orientation it will be necessary to rotate the pixels prior to storage in the frame buffer for display. For example, if the image data is stored in a landscape memory layout, and the electronic device uses a portrait mode display, then it is necessary to rotate the image data 90 degrees before displaying in order to ensure the correct orientation of the displayed image.

The rotation of the image data as described above may be performed in hardware or in software.

However, in some types of hardware, such as the Intel XScale processor, there may be no support for hardware image rotation. In this case it is necessary to add an additional external display controller that supports rotation. Adding an external display controller increases overall system cost, thus leading to a competitive disadvantage.

Alternatively, the image rotation may be implemented in software. Traditional software solutions to implement image rotation follows the order of processing shown in FIG. 1 of the drawings, an example using compressed video as the image source. As can be seen, there is first a decode stage 100 where source data (typically YUV data, i.e., data from the YUV color space in which a Y channel carries luminance information and a U and V channel carry chrominance information) is produced from compressed images. Thereafter, at 102 a color conversion transformation is applied to the decoded data to convert the data to the RGB (red/green/blue) color space. Finally at 104, the image data is rotated before being sent to a display screen. Having a separate color conversion step and rotation steps can significantly reduce the overall frame decode rate since the entire image data will have to be processed, including memory loading and storing, twice—once to do the color conversion and once to do the rotation. This slows the rate at which images can be displayed, which especially in the case of video images degrades a user's overall experience.

BRIEF DESCRIPTION OF THE DRAWINGS

FIG. 8 shows pseudo-code for doing image rotation in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
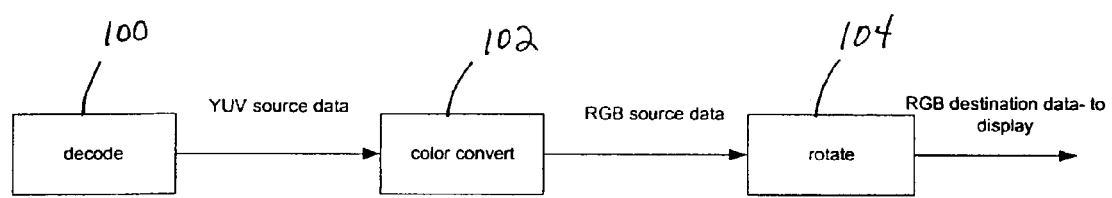
FIG. 1 is a flowchart to do image rotation in accordance with the prior art.
Figure 2:
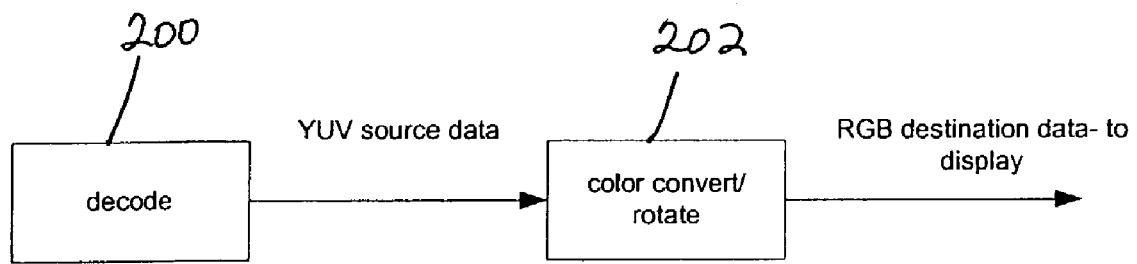
FIGS. 2 to 4 are flowcharts to do image rotation in accordance with embodiments of the invention.

FIG. 2 of the drawings shows a flowchart of operations performed by a system, in accordance with one embodiment of the invention. Referring to FIG. 2, at block 200, a processor decodes compressed images to produce YUV source data. At block 202, the processor performs a color conversion step to convert the YUV data to RGB data. Thereafter, the processor rotates the RGB data before storing the data in memory in accordance with a memory layout format suitable for display on a display screen of a system without any further rotation. For example, if the system supports a portrait mode of display, and the decoded YUV data was originally in a landscape memory layout, the color convert/rotate step 202 would rotate the data 90° to ensure that the data is stored in a portrait memory layout. Alternatively, if the source YUV data was in a portrait mode memory layout, and the display screen of the system displays data in a landscape orientation, then the color convert/rotate step 202 rotates the data 900 so that it is stored in a landscape memory orientation, and can therefore be displayed directly on the display screen without any further rotation.

In implementing the operations shown in FIG. 2 of the drawings, it is desirable to reduce the amount of memory accesses that are required. In particular, the performance costs of non-sequential loads and stores should be minimized.

Figure 3:
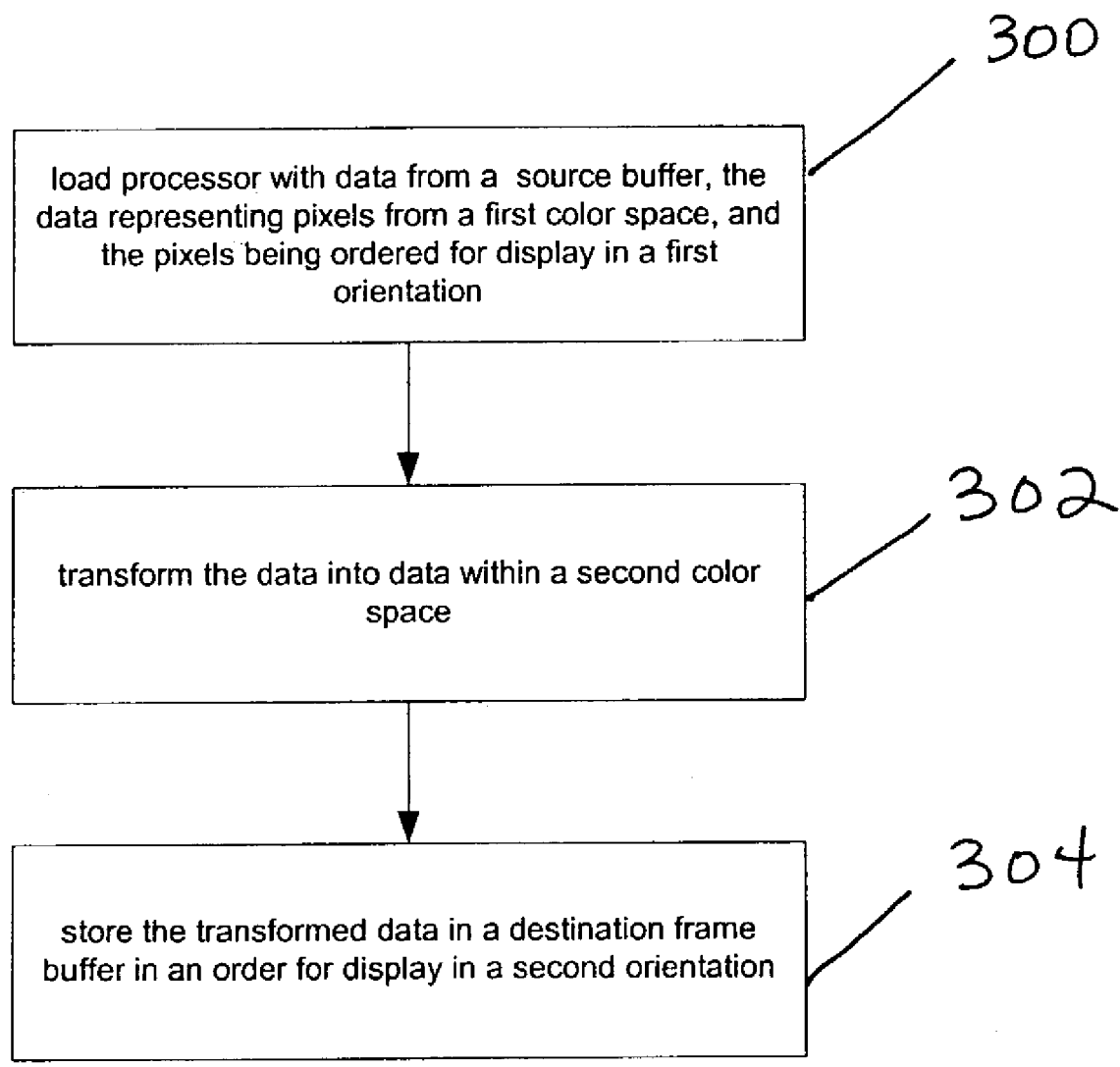

FIG. 3 of the drawings illustrates a flowchart of operations performed in accordance with one embodiment of the invention, in which the memory accesses are kept to a minimum. Referring to FIG. 3, at block 300, a processor is loaded with data from a source buffer. The data represents pixels from a first color space, which pixels are ordered for display in a first orientation, for example, a portrait orientation. At block 302, the data is transformed into data within a second color space. In one embodiment, the first color space is the YUV color space, and the second color space is the RGB color space. Thereafter, at block 304, the transformed data is stored in a destination buffer in an order or layout for display in a second orientation. In one embodiment, the second orientation is a landscape orientation.

Storing the transformed data in the destination buffer at block 304, involves several steps that ensure that the number of memory accesses is kept to a minimum. This is achieved by ensuring that the transformed data is cached in an on-chip cache. However, in some hardware/system designs, the destination buffer is not directly cacheable. Thus, the storing at block 304 involves the use of an intermediate buffer, which is cacheable, to ensure that the transformed data is stored in the on-chip cache. In one embodiment, the storing at 304 includes first storing the data in an intermediate buffer which is cacheable. Thereafter, instructions are issued to the processor to load the transformed data from the intermediate buffer and to store the transformed data in the destination buffer. Since the data in the intermediate buffer is resident in the on-chip cache, the processor simply copies the transformed data from the on-chip cache into its register space and stores the transformed data from the register space into the destination buffer.

In one embodiment, storing the transformed data in the intermediate buffer is done on a pixel-by-pixel basis. In other words, for each pixel stored in the intermediate buffer, an explicit store instruction is issued. Because the intermediate buffer is resident in on-chip cache, loads and stores referencing the intermediate buffer incur no memory transactions. However, when storing the data in the destination buffer, a single store instruction is used to store several pixels depending on the width of a store instruction. For example, in one embodiment, a single transformed pixel comprises two bytes of data. Thus, if the processor is an Intel XScale processor, then double loads/stores may be issued that are 8 bytes long/wide with the result that four transformed pixels may be written or stored to the destination buffer for every double store instruction, resulting in two consecutive 4-byte memory store cycles.

It will be appreciated that storing the transformed data in the destination buffer in the manner described above results in a minimization or saving in the number of memory cycles used (two consecutive 4-byte memory stores compared with four non-consecutive 2-byte memory stores).

The transforming of the data at block 302 includes, rotating the data 90 degrees if the first orientation is not the same as the second orientation.

In order to ensure that the processor is kept working at full capacity, the loading at block 300, may include, in some embodiments, prefetching some of the data into the on-chip cache.

Figure 4:
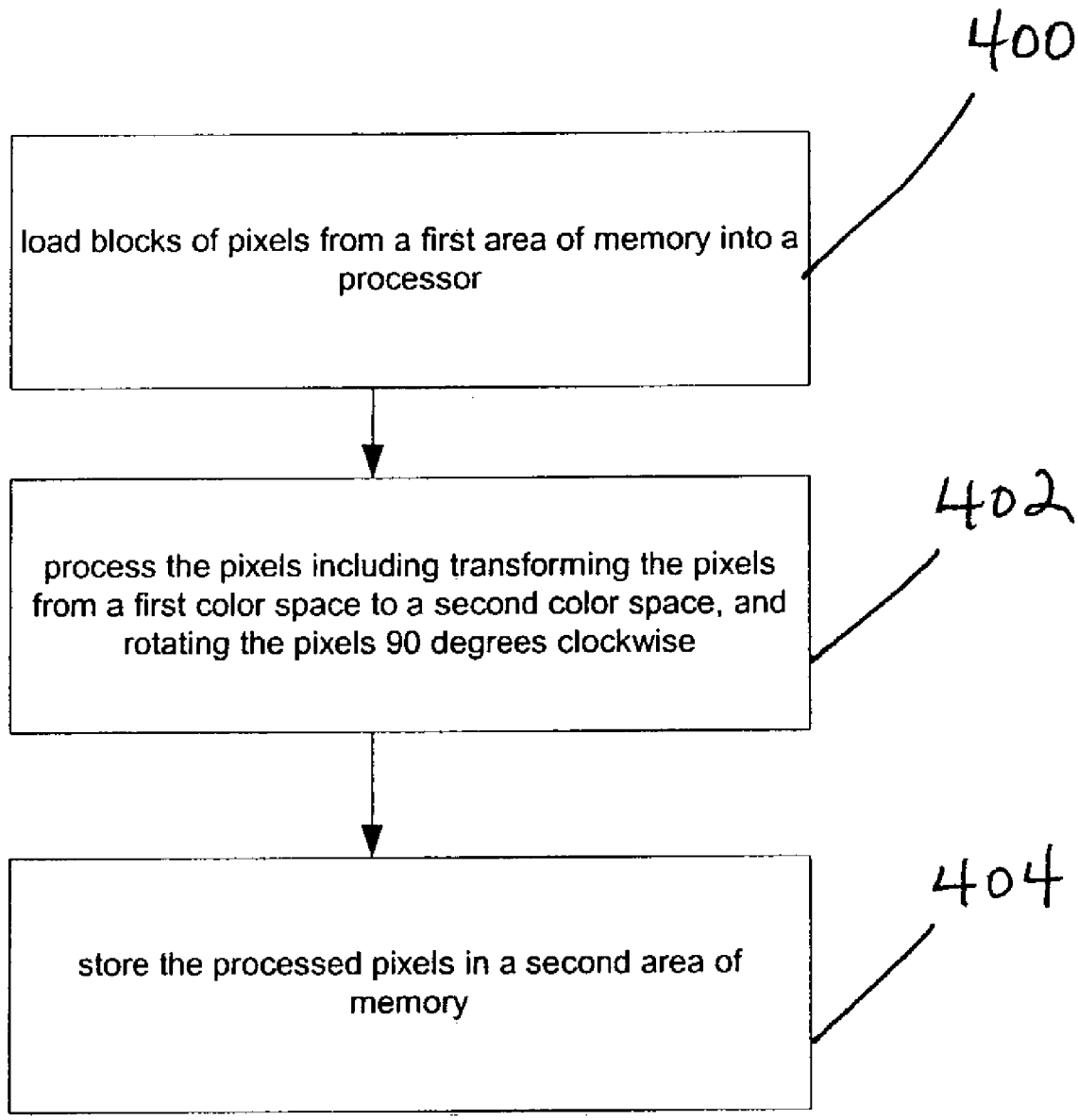

Referring now to FIG. 4 of the drawings, there is shown a flowchart of operations performed in accordance with another embodiment of the invention. As will be seen, at block 400, a processor is loaded with blocks of pixels from a first area of memory. At block 402, the pixels are processed including transforming the pixels from a first color space to a second color space, and rotating the pixels 900. Thereafter, at block 404, the processed pixels are stored in a second area of memory.

In one embodiment, the first color space is the YUV color space, and the second color space is the RGB color space. The first area of memory comprises a source buffer, and the second area of memory comprises a destination buffer.

In order to minimize the number of memory cycles required to store the processed pixels in the destination buffer, in one embodiment, the storing at block 404 comprises causing the processor to store the processed pixels in an on-chip cache. This is achieved in one embodiment by issuing instructions to the processor to cause the processor to store the processed pixels in an intermediate area of memory which is cacheable. Thereafter, the storing further comprises issuing instructions to the processor to load the processed pixels from the intermediate area of memory and to store the processed pixels in the second area. Since the data in the intermediate area of memory is stored on the on-chip cache, this results in the processor loading its register space with the data from the on-chip, and then subsequently transferring the data to the second area of memory. In one embodiment, one instruction per pixel is issued to the processor to cause the processor to store the processed pixels in the intermediate area of memory. However, one instruction per every four pixels is issued to the processor to store the processed pixels in the second area of memory.

In one embodiment, each block comprises 16 rows and 2 columns of landscape mode source pixels.

Figure 5:
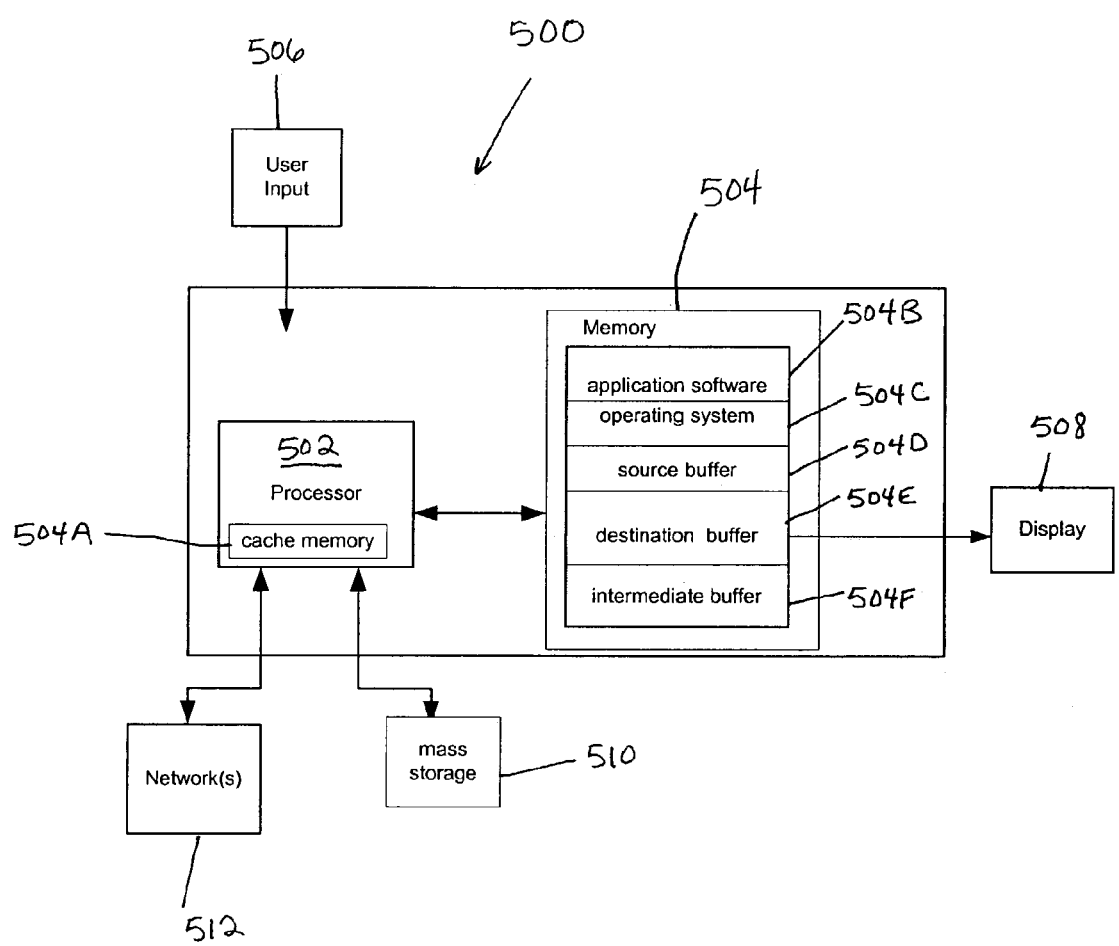
FIG. 5 is a block diagram of hardware in accordance with the invention.

Referring to FIG. 5 of the drawings, reference numeral 500 generally indicates hardware representative of a portable electronic device such as a PDA, Pocket PC, Personal Video Player (PVP), etc. The hardware 500 typically includes at least one processor 502 coupled to a memory 504. The processor 502 may represent one or more processors (e.g. microprocessors), and the memory 504 may represent random access memory (RAM) devices comprising a main storage of the hardware 500, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware 500, e.g. cache memory in the processor 502, as well as any storage capacity used as a virtual memory, e.g., as stored on a mass storage device 510. In one embodiment, the memory 504 can conveniently be thought of as having areas 504A-504F. The area 504A represents an on-chip cache memory. The area 504B is an area of the memory 504 wherein application software is loaded. The area 504C is an area of the memory 504 that contains an operating system for the hardware 500. The area 504D represents a source buffer, the area 504E represents a destination buffer, and the area 504F represents an intermediate buffer.

The hardware 500 also typically receives a number of inputs and outputs for communicating information externally. For interface with a user or operator, the hardware 500 may include one or more user input devices 506 (e.g., a keyboard, a stylus and digitizer, etc.) and a display 508 (e.g., a LCD panel).

For additional storage, the hardware 500 may also include one or more mass storage devices 510, e.g., a disk drive such as a Compact Flash device. Furthermore, the hardware 500 may include an interface with one or more networks 512 (e.g., a lan a WAN, a wireless network, and/or the Internet among others) to permit the communication of information with other computers coupled to the networks. It should be appreciated that the hardware 500 typically includes suitable analog and/or digital interfaces between the processor 502 and each of the components 504, 506, 508 and 512 as is well known in the art.

The hardware 500 operates under the control of an operating system that executes various computer software applications, components, programs, objects, modules, etc. (e.g. a program or module which performs operations as shown in FIGS. 4 and 5 of the drawings).

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually effect the distribution. Examples of signal bearing media include but are not limited to recordable type media such as volatile and non-volatile memory devices, floppy and other removable disks, hard disk drives, optical disks (e.g. Compact Disk Read-Only Memory (CD ROMS), Digital Versatile Disks (DVDs), etc.), among others, and transmission type media such as digital and analog communication links.

Figure 6:
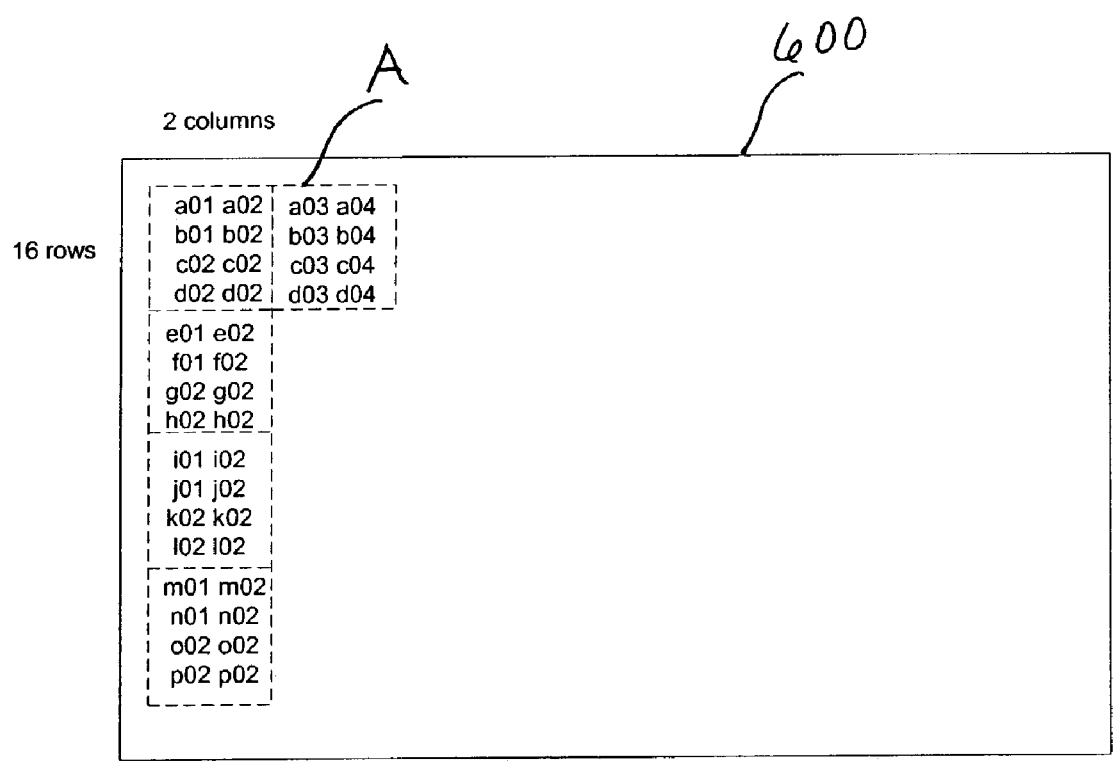
FIG. 6 illustrates a memory layout of a source buffer.

Referring to FIG. 6 of the drawings, in order to better understand the operations described with reference to FIGS. 3 and 4 of the drawings, a landscape memory layout 600 for data in the source buffer 504D, in accordance with one embodiment is illustrated. Referring to FIG. 6, a01, a02, b01, b02, etc. each represents a pixel in the source buffer 504D. In the loading operations referred to in FIGS. 3 and 4 of the drawings, a block of data comprising 16 rows and 2 columns of pixels is loaded into the processor 502. In particular, the 16×2 block of pixels is loaded into the cache memory 502A. The exact number of the rows that are loaded will depend on the number of cache lines available within the cache memory 502A. In this example, the cache memory 502A comprises 16 cache lines, thus 16 rows of data are loaded into the cache memory 502A. The number of bytes comprising a cache line is processor-dependent; for Intel XScale processors, the length is 32 bytes. Loading 16 rows therefore loads 16 rows of 32 bytes each from the source buffer into the cache memory. Thereafter, the 16×2 block is converted into the RGB color space, as described, rotated, as described, and then stored in a destination buffer 504E as described.

Figure 7:
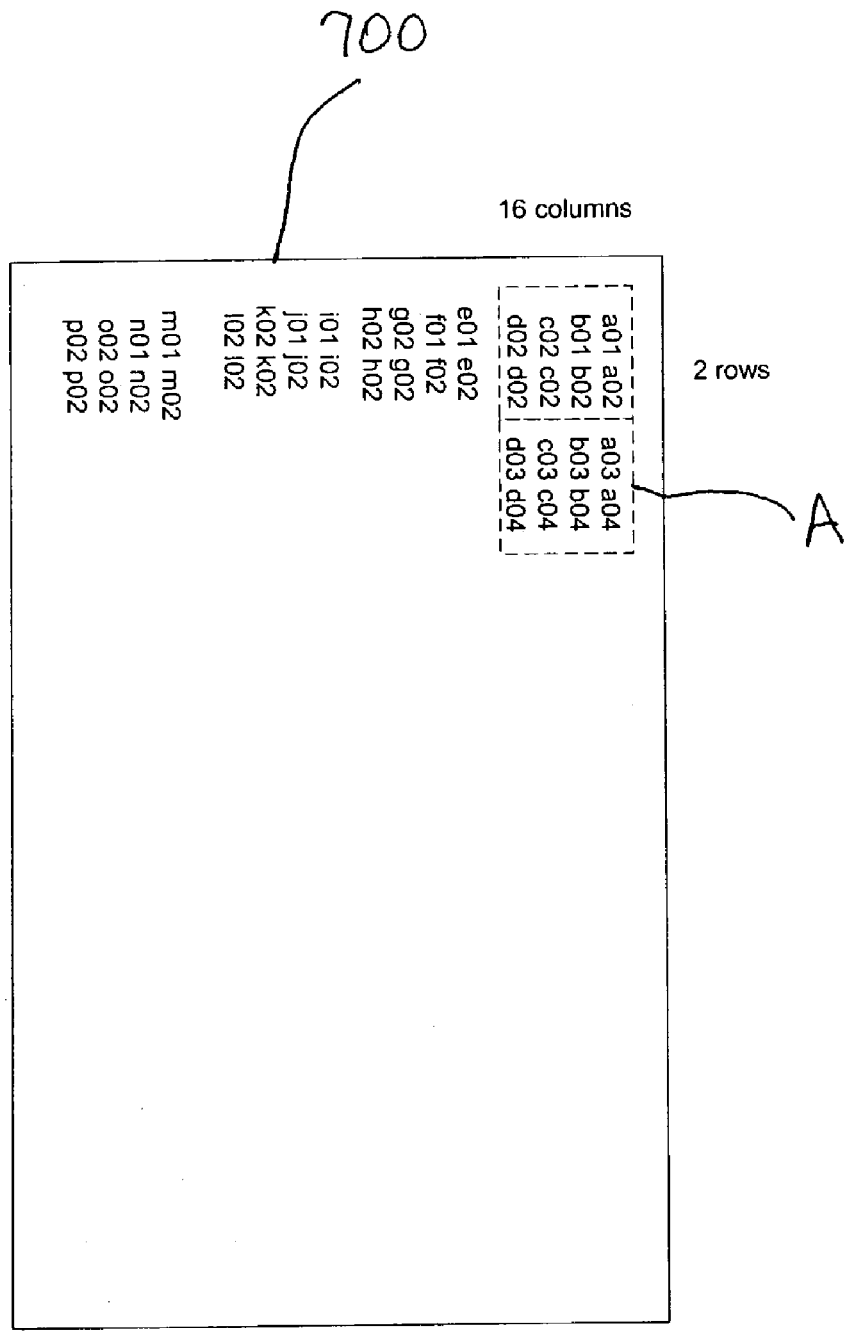
FIG. 7 illustrates a memory layout of the destination buffer corresponding to the source buffer of FIG. 6 after image rotation in accordance with the invention.

FIG. 7 of the drawings shows a memory layout 700 of the destination buffer 504E. As will be seen, the original 16×2 block of data has a portrait layout such that there are now 16 columns and 2 rows. The memory layout 700 ensures that the contents of the destination buffer 504E may be displayed without any further rotation being required, so that an image appears in the landscape orientation on hardware configured to display images in a portrait orientation.

The next block of data that is processed is the next 16×2 block labeled A in FIG. 6. It will be appreciated that no additional loads from the source buffer are required to process block A because the data is already present in the cache memory. Once all 16×2 blocks that share the same 16 rows have been processed, the next 16 rows of data in the source buffer 504D are processed in blocks of 16×2 from left to right as described. This process continues until all data in the source buffer 504D has been read and processed.

FIG. 8 of the drawings shows an algorithm, in pseudo-code, that may be used to practice the methods described with reference to FIGS. 3 and 4 of the drawings. Naturally, one skilled in the art would appreciate that other algorithms may be used to practice the method shown in FIGS. 3 and 4 of the drawings.

For the purposes of this specification, a machine-readable medium includes any mechanism that provides (i.e. stores and/or transmits) information in a form readable by a machine (e.g. computer) for example, a machine-readable medium includes read-only memory (ROM); random access memory (RAM); magnetic disk storage media; optical storage media; flash memory devices; electrical, optical, acoustical or other forms of propagated signals (e.g. carrier waves, infra red signals, digital signals, etc.); etc.

It will be apparent from this description that aspects of the present invention may be embodied, at least partly, in software. In other embodiments, hardware circuitry may be used in combination with software instructions to implement the present invention. Thus, the embodiments of the invention are not limited to any specific combination of hardware circuitry and software.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
    loading a processor with data from a source buffer, the data representing pixels from a first color space, and the pixels being ordered for display in a first orientation;
    transforming the loaded data into data within a second color space;
    storing the transformed data in a destination buffer in an order for display in a second orientation; and
    constructing an image based on the transformed data in the destination buffer, wherein the image appears in a landscape orientation on a device configured to display images in a portrait orientation, there being no rotation of the transformed data.

2. The method of claim 1, wherein the first color space comprises the YUV color space, and the second space comprises the RGB color space.

3. The method of claim 1, wherein the first orientation comprises a landscape orientation, and the second orientation is a portrait orientation.

4. The method of claim 1, wherein the storing comprises causing the processor to first store the transformed data in an on-chip cache.

5. The method of claim 4, wherein causing the processor to first store the transformed data in the on-chip cache comprises issuing individual store instructions to cause the processor to store the transformed pixels in an intermediate buffer, which is cacheable.

6. The method of claim 5, wherein the storing comprises issuing instructions to cause the processor to load the transformed data from the on-chip cache and to store the transformed data in the destination storage buffer.

7. The method of claim 4, wherein the loading comprises prefetching some of the data into the on-chip cache.

8. The method of claim 1, wherein the storing comprises rotating the data 90 degrees.

9. A computer-readable medium having stored thereon a sequence of instructions which when executed by a processor cause the processor to perform a method comprising:
    loading the processor with data from a source buffer, the data representing pixels from a first color space, and the pixels being ordered for display in a first orientation;

transforming the loaded data into data within a second color space;

storing the transformed data in a destination buffer in an order for display in a second orientation; and constructing an image based on the transformed data in the destination buffer, wherein the image appears in a landscape orientation on a device configured to display images in a portrait orientation, there being no rotation of the transformed data.

10. The computer-readable medium of claim 9, wherein the first color space comprises the YUV color space, and the second space comprises the RGB color space.

11. A system, comprising:

a processor; and a memory coupled to the processor, the memory storing instructions which when executed by the processor cause the processor to perform a method comprising:

loading a processor with data from a source buffer, the data representing pixels from a first color space, and the pixels being ordered for display in a first orientation;

transforming the loaded data into data within a second color space; storing the transformed data in a destination buffer in an order for display in a second orientation; and constructing an image based on the transformed data in the destination buffer, wherein the image appears in a landscape orientation on a device configured to display images in a portrait orientation, there being no rotation of the transformed data.

12. The system of claim 11, wherein the first color space comprises the YUV color space, and the second space comprises the RGB color space.

* * * * *